United States Patent Office 2,981,597
Patented Apr. 25, 1961

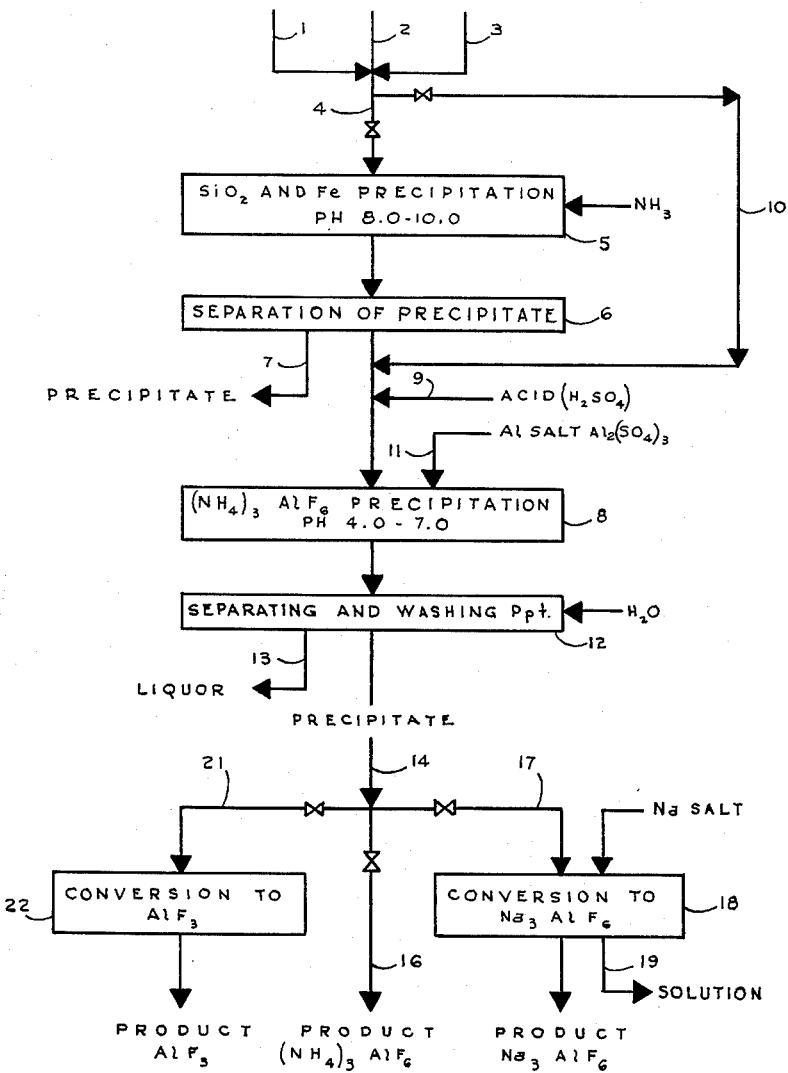

2,981,597
MANUFACTURE OF AMMONIUM CRYOLITE

Grady Tarbutton, Thad D. Farr, and Thomas M. Jones, Sheffield, and Harry T. Lewis, Jr., Florence, Ala., assignors to Tennessee Valley Authority, a corporation of the United States Filed Oct. 13, 1958, Ser. No. 767,071

3 Claims. (Cl. 23—88)

(Granted under Title 35, U.S. Code (1952), sec. 266)

The invention herein described may be manufactured and used by or for the Govermnet for governmental purposes without the payment to us of any royalty therefor.

This invention is an improved process for the manufacture of ammonium cryolite. This process is especially valuable in the recovery of byproduct fluorine from scrub liquors obtained by scrubbing gases emitted from processes in the phosphate industry with aqueous ammonium fluoride liquor maintained in the range from pH 5 to 6 by addition of ammonia. Such scrub liquors are very impure. The contain phosphorus as well as fluorine and may contain silica, iron, sulfur oxides, or any other materials contained in liquid or solid particles entrained in gases emitted from such processes. Ammonium cryoiite of high purity may be considered as an end product or as an intermediate in the recovery of byproduct fluoride as aluminum fluoride or cryolite, $Na_3AlF_6$.

Fluorine is evolved in the processing of phosphate rock and related processes as hydrogen fluoride, silicon tetrafluoride, or a mixture of the two gases. It is estimated that about 100,000 tons of fluorine were evolved in processing about 11,000,000 tons of phosphate rock in the United States in 1955. The effluent gases usually are dilute with relation to fluorine compounds, usually contain compounds of silicon, and they may contain phosphorus compounds, carbon dioxide, oxides of sulfur, water vapor, and entrained solid and liquid particles. The development of processes for the recovery of useful fluorine compounds from such gases has been handicapped by the low concentration of fluorine and the associated contaminants.

It is known that fluorine compounds can be removed readily from the gases evolved in processing phosphate rock by scrubbing the gases with slightly acidic aqueous ammonium fluoride. Scrub liquor is recycled, and its acidity is controlled by adding ammonia. Hydrogen fluoride dissolves and reacts with ammonia in the aqueous solution to form ammonium fluoride. Silicon tetrafluoride dissolves in aqueous ammonium fluoride to form a solution of ammonium fluosilicate. In contrast, when silicon tetrafluoride is scrubbed with water, about one-third of the silica precipitates in a gelatinous form and two-thirds dissolves to form fluosilicic acid. When the scrubbing solution is kept slightly acidic (pH 5 to 6), carbon dioxide is not absorbed, the absorption of sulfur dioxide is limited, and the solution is not highly corrosive. Moreover, the partial pressure of ammonia over such solutions is low and little ammonia is lost in the scrubbing operation.

In the production of elemental phosphorus by the electric-furnace process, phosphorus vapor is condensed by cooling with recycled aqueous spray liquor. To minimize corrosion in the condenser system, where acid is formed, an alkaline agent is added to the liquor. When ammonia is used for this purpose, fluorine evolved from the electric furnace is absorbed to form ammonium fluosilicate and ammonium fluoride. The condenser liquor also contains phosphorus compounds and solids.

The weight ratio $F:P_2O_5$ in liquors obtained by scrubbing effluent gases from phosphate-rock processing plants and the like with slightly acidic ammonium-fluoride solutions varies widely. For example, recycled liquor (pH maintained in the range from 5.0 to 6.0 by adding ammonia) used for condensing phosphorus from electric-furnace gas was found to contain fluorine and phosphorus pentoxide in weight ratios $F:P_2O_5$ ranging from 1.4 to 1.8. The liquor formed by scrubbing nodulizing kiln effluent gas had weight ratios $F:P_2O_5$ ranging from 10:1 to 30:1, and the liquor formed by scrubbing the effluent gas from a calcium metaphosphate fertilizer furnace had weight ratios $F:P_2O_5$ in the range from 6:1 to 8:1. When gases evolved in the manufacture of superphosphate are scrubbed with a slightly acidic solution of ammonium fluoride, the weight ratio $F:P_2O_5$ in the liquor may be 100:1 or higher.

One large producer of aluminum sets the following specifications for synthetic ammonium cryolite:

Fluorine content at least 85 percent of that represented by the formula $(NH_4)_3AlF_6$ Maximum limits of impurities:

|  | Percent |
|---|---|
| $P_2O_5$ | 0.1 |
| $SiO_2$ | 0.6 |
| $Fe_2O_3$ | 0.25 |
| $SO_3$ | 5 |

The term "specification-grade ammonium cryolite" is used in this specification and subtended claims to mean ammonium cryolite conforming to the above specifications.

It is an object of our invention to provide a process for the production of cryolite, $(NH_4)_3AlF_6$, of purity at least as high as that required to meet the specifications given above from byproduct fluorine scrub liquors contaminated with phosphorus.

Another object is to provide such process which is applicable to scrub liquors having a wide range of $F:P_2O_5$ ratios.

Another object is to provide such process in which a high percentage of fluorine is recovered.

Still another object is to provide a process of the above type which is cheap and simple in operation and for which equipment costs are not excessive.

Other objects and advantages will be apparent from the description given below.

We have found that ammonium cryolite, unlike other fluorine salts, is not contaminated with appreciable quantities of coprecipitated phosphorus compounds when precipitated at a pH in the range from 4 to 7 by addition of 90 to 100 percent of the quantity of aluminum theoretically required to form ammonium cryolite with all fluorine present according to the equation $$12NH_4F + Al_2(SO_4)_3 \rightarrow 2(NH_4)_3AlF_6 + 3(NH_4)_2SO_4$$

By this procedure we have prepared ammonium cryolite precipitates consistently containing phosphorus equivalent to less than 0.1 percent $P_2O_5$, even from solutions having $F:P_2O_5$ weight ratios several hundred times less than that of the precipitate. The lower limit of the pH range in which our process can be operated is much below 4.0. The process probably will operate at a pH of 1.0, but fluorine recovery at such high acidity is not satisfactory.

We have found also that an excess of sulfur, iron, and silica in the solutions from which ammonium cryolite is precipitated does not contaminate the precipitate excessively. Ammonium cryolite of specification grade may be produced from solutions having a weight ratio $F:SiO_2$ of 15:1, several times higher than the quantity of silica permitted in the specification-grade product. The precipitate is not contaminated with excess iron when the $F:Fe_2O_3$ weight ratio is 100:1 or more. The quantity of sulfate present is immaterial.

Ammonium cryolite of specification grade is easily prepared from scrub liquors containing compounds of fluorine, phosphorus, silicon, iron and sulfur resulting from scrubbing waste gases emitted from processes in the phosphate industry with aqueous ammonium fluoride liquor maintained at an acidity in the range from about pH 5.0 to 6.0 by addition of ammonia. Briefly, our process comprises introducing a solution of a soluble aluminum salt such as aluminum sulfate into a solution containing fluorine and phosphate in such proportions that the weight ratio of $F:P_2O_5$ is in the range from about 1:1 to 400:1, or preferably in the range from about 1.5:1 to about 125:1, containing at least enough ammonium ion to form $(NH_4)_3AlF_6$ with all fluorine present and containing not more silica and iron than represented by $F:SiO_2$ and $F:Fe_2O_3$ weight ratios of 15:1 and 100:1, respectively; controlling the pH of the solution in the range from about 4.0 to 7.0; controlling the proportion of aluminum salt added to furnish from about 90 to 100 percent of the aluminum theoretically required to form $(NH_4)_3AlF_6$ with all fluorine present; removing the resulting precipitate; washing the precipitate; and receiving ammonium cryolite of specification grade.

Under practical conditions, our maximum advantages are obtained in $F:P_2O_5$ weight ratios in the range from about 1.5:1 to about 125:1. Although our process is operable down to a weight ratio $F:P_2O_5$ of 1.0:1, fluorine recovery is better when this ratio is somewhat higher.

The attached drawing is a flow sheet illustrating a process conducted according to principles of our invention. In the drawing the reference numerals 1, 2, and 3 indicate one or more scrub liquors resulting from scrubbing gases emitted from processes in the phosphate industry. The scrub liquors may vary widely in composition, but will contain compounds of fluorine and phosphorus together with congeneric impurities. Silica, iron, oxides of sulfur, and entrained solid and liquid particles from any particular process are the principal congeneric impurities.

Scrub liquors from various processes may vary widely in $F:P_2O_5$ weight ratios. For example, scrub liquor from a phosphate rock nodulizing kiln frequently has a weight ratio $F:P_2O_5$ of about 10:1, condenser liquor from a phosphorus smelting furnace may have a weight ratio $F:P_2O_5$ between 1:1 and 2:1, and scrub liquor from metaphosphate furnaces may have a weight ratio $F:P_2O_5$ between 5:1 and 7:1. Scrub liquors from other processes, such as concentration of wet-process phosphoric acid, treatment of phosphate rock with acid, curing superphosphate, et cetera, will have their own characteristic ratios.

Since liquors having $F:P_2O_5$ weight ratios in the range from 1:1 to 400:1 may be fed into our process, we prefer to combine them in a single stream at 4 using such proportions of each liquor, if possible, that the weight ratio $F:P_2O_5$ of the combined stream is 4:1 or more. A weight ratio of 4:1 is sufficiently high that no difficulties are encountered in carrying out the process. The combined stream, when the silica and iron contents are high, is passed by line 4 to a silica and iron precipitation step 5. In this step, ammonia is added to the scrub liquor in quantity sufficient to raise the pH of the solution into the range from 8 to 10, preferably about 8.5 to 9.0. Silica and iron precipitate. About 15 percent of the total amount of phosphorus present also may be found in the precipitate. The voluminous silica and iron precipitate also carries down with it any suspended solids and various other impurities. However, very little of the fluorine present is included in the precipitate.

The precipitate and solution are then passed to a precipitate-separation step 6. This step may be conducted by filtration, centrifuging, decantation, or other suitable processes. Filtration is our method of choice. The resulting precipitate is washed and discarded via line 7. Wash water from this step should be recycled for use as make-up water in scrubbers to avoid dilution of the solution to be treated further. The liquor is passed to an ammonium cryolite precipitation step 8. The solution is acidified to a pH in the range from about 4 to 7, preferably by sulfuric acid introduced through line 9. The pH used within this range will depend on the $F:P_2O_5$ weight ratio in the solution. When the $F:P_2O_5$ weight ratio is low, a low pH should be used, below 5.0 and preferably about 4.5. The pH can be increased with increase of the $F:P_2O_5$ weight ratio to above 5.0 when the $F:P_2O_5$ weight ratio is at least 10:1, and up to about pH 7 when the $F:P_2O_5$ weight ratio is at least 40:1.

In step 8, ammonium cryolite is precipitated by adding a soluble salt, preferably aluminum sulfate, in quantity sufficient to furnish from 90 to 100 percent of the theoretical amount of aluminum required for formation of ammonium cryolite according to the equation given above. Like the pH of the solution, the quantity of aluminum added is controlled according to the $F:P_2O_5$ weight ratio in the solution in this step. When the $F:P_2O_5$ weight ratio is 10:1 or more, 100 percent of the aluminum theoretically required may be added at a pH from 5 to 5.8. When the $F:P_2O_5$ weight ratio is 5:1 or more, only 95 percent of the theoretical requirement of aluminum should be added at a pH from 4.5 to 5.0. If the $F:P_2O_5$ weight ratio is very low, for example 1.5:1, about 90 percent of the theoretical requirement of alumina is indicated and a pH of about 4. Under these conditions of acidity and proportions of aluminum added, the precipitate fully meets the requirements for specification-grade cryolite after washing.

The liquor and precipitate are then passed to a precipitate separation and washing step 12. Liquor and washings are withdrawn via line 13. These may contain sufficient phosphorus and other materials to make their recovery worth while. The precipitate is withdrawn via line 14. It may be continued through line 16 to emerge as a product of ammonium cryolite which contains more than 85 percent of the fluorine represented by the formula $(NH_4)_3AlF_6$. It contains less than 0.1 percent phosphorus as $P_2O_5$, less than 0.6 percent of silicon as $SiO_2$, less than 0.25 percent of iron as $Fe_2O_3$, and less than 5 percent of sulfur as $SO_3$. However, since the more commercially desirable products are sodium cryolite or aluminum fluoride, we prefer to pass all or part of the ammonium cryolite precipitate via line 17 to a sodium cryolite conversion step 18. In this step, ammonium cryolite is merely agitated with a soluble sodium salt such as sodium chloride, and it is converted to $Na_3AlF_6$. The solution containing ammonia is withdrawn via line 19 and preferably is passed to an ammonia-recovery system (not shown).

Alternatively, all or part of the ammonium cryolite precipitate may be passed via line 21 to a step 22 for conversion to aluminum fluoride. This step may be carried out in a number of different ways. For example, the precipitate may be heated to the decomposition point. Ammonium fluoride is driven off and might be recycled to the process, and a product of aluminum fluoride is withdrawn. This product we have found consistently to contain less than the quantities of impurities permitted in specification-grade ammonium cryolite. This step might be conducted also by treating the ammonium cryolite precipitate with hydrated alumina.

When the scrub liquors entering the process via line 4 are relatively low in silica and iron, so that the $F:SiO_2$ weight ratio is about 15:1 or more and the $F:Fe_2O_3$ weight ratio is at least 100:1, we have found that it is possible to bypass the silica and iron precipitation step 5. The liquor is merely sent via line 10 directly to the ammonium cryolite precipitation step 8. Even though the $F:P_2O_5$ and the $F:SiO_2$ weight ratios in the liquor are many times more than can be permitted in the precipitate, we have found that the product recovered under the conditions of PH and insufficient alumina described above uniformly is a specification-grade ammonium cryolite.

Specification applications of our process are given in the following examples. Bench-scale tests of the methods described above were made with ammonium fluoride solutions prepared from nodulizing kiln gas scrubber liquor, phosphorus condenser liquor, and metaphosphate furnace gas scrubber liquor, as described respectively in Examples I, II, and III below. Example IV describes by outline and examples an integrated process that utilizes the combined liquors from all three sources for the preparation of ammonium cryolite as an end product or as an intermediate in the preparation of sodium cryolite or aluminum fluoride.

EXAMPLE I

An ammonium fluoride test solution (stock solution A) was prepared by treating a portion of the kiln gas scrubber liquor (F, 30.7; $SiO_2$, 10.5; $P_2O_5$, 1.15; S, 17.2; $Fe_2O_3$, 0.7; CaO, 0.1; $Al_2O_3$, 0.3; $K_2O$, 0.2 gram per liter) with aqueous ammonia to raise the pH from 5.5 to about 9, filtering and washing the precipitate, and concentrating the filtrate in glass beakers to about one-third its original volume. This solution had a weight ratio $F:P_2O_5$ of 40:1 and contained F, 93.4; $P_2O_5$, 2.3; and aluminum, 0.8 gram per liter.

In some of the tests, ammonium phosphate was added to solution A to decrease the weight ratio of $F:P_2O_5$ from 40:1 to 25:1, 10:1, or 5:1. The amount of $P_2O_5$ coprecipitated with the ammonium cryolite from these solutions was determined as functions of the proportion of the aluminum added and the pH of the precipitation mixture.

The results, summarized in the table below, show that substantially none of the $P_2O_5$ was coprecipitated with the cryolite from solutions in which the weight ratio $F:P_2O_5$ was 25:1 or higher, the pH was 5.8, and the theoretical quantity of aluminum was used. Similar results were obtained when 95 percent of the theoretical quantity of aluminum was added to a liquor having a weight ratio $F:P_2O_5$ of 10:1. Variation of the pH of the precipitation mixture in the range 5 to 7 had no significant effect on the $P_2O_5$ content of the cryolite when the weight ratio $F:P_2O_5$ was 40:1. The results show further that cryolite meeting the specification for phosphorus content was precipitated when the weight ratio $F:P_2O_5$ was 5:1, the pH ranged between 4.6 and 5.0, and 95 percent theoretical aluminum was used.

| Precipitation | | | Ammonium cryolite [1] | | | | | |
|---|---|---|---|---|---|---|---|---|
| Weight ratio $F:P_2O_5$ | Al, percent [2] | pH [3] | Composition, percent | | | | Recovery, percent | |
| | | | $P_2O_5$ | F | Al | $NH_3$ | F | Al |
| 40:1 | 100 | 7.0 | 0.01 | 57.3 | 14.5 | 25.2 | 93 | 99 |
| | 95 | 7.0 | 0.04 | 54.3 | | | 90 | |
| | 100 | 6.5 | 0.02 | 57.2 | | | 96 | |
| | 95 | 6.5 | 0.01 | 57.7 | | | 88 | |
| | 100 | 5.8 | 0.01 | 58.0 | 14.8 | 25.4 | 89 | 95 |
| | 95 | 5.8 | 0.01 | 57.4 | 14.6 | 25.6 | 82 | 93 |
| | 100 | 5.0 | 0.01 | 57.8 | | | 86 | |
| | 95 | 5.0 | 0.01 | 57.5 | | | 84 | |
| 25:1 | 100 | 5.8 | 0.01 | 57.5 | 14.6 | 25.6 | 91 | 97 |
| | 100 | 5.8 | 0.09 | 54.9 | | | 92 | |
| 25:1 | 100 | 5.8 | 0.03 | 56.9 | | | 90 | |
| | 100 | 5.0 | 0.07 | 56.4 | | | 91 | |
| | 95 | 5.8 | 0.02 | 57.7 | 14.7 | 25.6 | 87 | 99 |
| 5:1 | 100 | 5.8 | 0.74 | | | | | |
| | 95 | 5.8 | 0.52 | | | | | |
| | 90 | 5.8 | 0.18 | | | | | |
| | 95 | 5.0 | 0.05 | 56.0 | | | 83 | |
| | 95 | 4.6 | 0.07 | 55.5 | | | 85 | |
| | 95 | 4.8 | 0.03 | 56.8 | | | 79 | |
| | 95 | 4.6 | 0.03 | 56.9 | | | 79 | |

[1] Tests were made in duplicate. There were no significant differences in the results of duplicate tests; results are given for only one of each pair. Each test solution contained 3 grams of fluorine.
[2] Basis, stoichiometric requirement for formation of $(NH_4)_3AlF_6$.
[3] Measured with "Accutint" indicator paper.

EXAMPLE II

The sources of the test solutions were two liquors, CL-5 and CL-6, from a condenser system of a phosphate smelting furnace. These liquors were collected as condenser spray liquor that had been recirculated without bleed-off for 39 days (CL-5), or without bleed-off for 66 days (CL-6).

Samples of these liquors were stored in 5-gallon polyethylene carboys. The compositions of the supernatant liquors are tabulated below. Crystals identified petrographically as ammonium fluosilicate were found on the walls of the plastic containers used to store the liquors. It is probable, therefore, that both liquors were saturated solutions. Solution CL-6 was analyzed by paper chromatography; orthophosphate, hypophosphates, and phosphites were the only phosphorus compounds found.

| Liquor | Composition, grams/liter | | | |
|---|---|---|---|---|
| | F | $P_2O_5$ | $NH_3$ | $SiO_2$ |
| CL-5 | 82.7 | 53.3 | 52.6 | |
| CL-6, fresh | 86.5 | 47.1 | 47.3 | |
| CL-6, after 3 months | 83.7 | 45.9 | 45.8 | 42.3 |

The $NH_4F$ solutions used for the tests were prepared as follows: Several liters of liquor CL-6 were ammoniated to pH 8.8; the precipitated solids (mostly silica) were filtered off but not washed; and the filtrate was stored in a plastic bottle and labeled stock solution 103. Another stock solution, 100, was prepared by ammoniating condenser liquor CL-5 to pH 8.8, and the precipitated solids were filtered off and washed with water. The composition of the stock solution 103 was F, 71.8; $P_2O_5$, 39.5; Al, 0.3 gram per liter; and the composition of solution 100 was F, 55.0; $P_2O_5$, 33.2; Al, 0.6 gram per liter.

The conditions and the results obtained in laboratory studies are shown in the following table. These results show that ammonium cryolite meeting the specifications for phosphorus content was prepared from phosphorus condenser liquor in which the weight ratio $F:P_2O_5$ was as low as 1.7:1 by using (1) quantities of aluminum ion equivalent to 90 to 95 percent of the theoretical amount required to form ammonium cryolite, and (2) a pH range of 4 to 5. The recovery of fluorine in the test solution ranged from 78 to 87 percent.

| Test [1] | Conditions | | | | | Ammonium cryolite | | Fluorine recovery, percent |
|---|---|---|---|---|---|---|---|---|
| | Precipitation | | | | Wash water, ml.[4] | Composition, percent | | |
| | Weight ratio, F:P₂O₅ | Al, percent [2] | pH [3] | Solution volume, ml. | | P₂O₅ | F | |
| Ammoniated condenser liquor 103: | | | | | | | | |
| C-CL-9 | 1.8:1 | 95 | 5.0 | 90 | 30 | 0.11 | 57.1 | 87 |
| C-CL-10 | 1.8:1 | 95 | 4.0 | 90 | 30 | 0.08 | 57.1 | 86 |
| C-CL-11 | 1.8:1 | 95 | 4.0 | 90 | 60 | 0.07 | 56.8 | 78 |
| C-CL-15 | 1.8:1 | 95 | 4.0 | 88 | 30 | 0.03 | 57.5 | 82 |
| C-CL-15a | 1.8:1 | 90 | 4.0 | 88 | 30 | 0.03 | 57.1 | 82 |
| Ammoniated condenser liquor 100: | | | | | | | | |
| C-CL-12 | 1.7:1 | 95 | 4.0 | 102 | 30 | 0.07 | 57.0 | 86 |
| C-CL-13 | 1.7:1 | 95 | 4.0 | 102 | 30 | 0.09 | 56.3 | 86 |
| C-CL-14 | 1.7:1 | 95 | 5.0 | 102 | 30 | 0.06 | 56.4 | 86 |

[1] A volume of ammoniated condenser liquor containing 3 grams of fluorine was used in each test.
[2] Basis, stoichiometric requirement for formation of (NH₄)₃AlF₆.
[3] Measured with "Accutint" indicator paper.
[4] Precipitates washed with 10-ml. portions of water.

EXAMPLE III

The source of the ammonium fluoride test solution was a metaphosphate liquor (F, 83.7 and P₂O₅, 12.8 grams per liter) which was obtained by scrubbing the offgas from a metaphosphate furnace with aqueous ammonia. Several liters of this liquor were ammoniated to pH 8.8, the precipitated solids filtered off, and the filtrate diluted with H₂O. The test solution analyzed F, 57.7; P₂O₅, 8.8; and Al, 0.4 gram per liter.

The results in the tabulation below show that cryolite meeting the specification for phosphorus content was precipitated when the weight ratio F:P₂O₅ was 6.6:1, the pH was 5.0, and 95 percent theoretical aluminum was used.

| Precipitation [1] | | | | Ammonium cryolite composition, percent P₂O₅ |
|---|---|---|---|---|
| Weight ratio, F:P₂O₅ | Al,[2] percent | pH [3] | Volume of mixture, ml. | |
| 6.6:1 | 95 | 5.8 | 97 | 0.50 |
| 6.6:1 | 95 | 5.0 | 97 | 0.05 |
| 6.6:1 | 95 | 5.0 | 97 | 0.05 |

[1] A volume of ammoniated metaphosphate liquor containing 3 grams of fluorine was used in each test.
[2] Basis, stoichiometric requirement for formation of (NH₄)₃AlF₆.
[3] Measured with "Accutint" indicator paper.

EXAMPLE IV

Ammonium cryolite can be prepared from combined liquors as an end product or an intermediate in the recovery of byproduct fluorine as sodium cryolite or aluminum fluoride by utilizing an integrated byproduct recovery process. This process is outlined below and is summarized in the attached drawing. The tonnages of fluorine and phosphoric oxide shown are estimated daily productions of one particular plant having a phosphate rock nodulizing kiln, a calcium metaphosphate furnace, and an electric furnace for smelting phosphate rock.

Step 1.—Nodulizing kiln gas

[1.4 tons F, 0.14 ton P₂O₅; weight ratio F:P₂O₅, 10]

(a) Scrub the kiln gas with aqueous ammonium fluoride, keeping the pH in the range 5 to 6 by addition of aqueous ammonia. The liquor is recycled to produce a solution containing about 80 grams of fluorine per liter. An efficient scrubber system is required.

(b) Filter to remove solid material, which is washed and returned to the kilns. The wash water is recycled to the scrubber.

(c) The filtrate from (b) enters via line 1 and is combined with filtrates from steps 2(b) and 3(b), below, obtained from the metaphosphate gas scrubber and condenser liquor systems.

Step 2.—Metaphosphate furnace effluent gas

[2.8 tons F, 0.35 ton P₂O₅; weight ratio F:P₂O₅, 8]

(a) Scrub the gas as in step 1(a). Solids are recovered for their phosphate value.

(b) The filtrate from 2(a), which may contain as much as 100 grams of fluorine per liter, enters via line 2 and is combined with the liquor from the kiln gas system step 1(b) and the condenser liquor step 3(a).

Step 3.—Phosphorus condenser liquor

[1.4 tons F, 0.8 ton P₂O₅; weight ratio F:P₂O₅, 1.8]

(a) The condenser liquor contains suspended matter including elemental phosphorus, which may be removed by settling or filtering.

(b) Combine the liquid phase entering via line 3 with the filtrates from steps 1(b) and 2(a).

Step 4.—Combined liquors

[5.6 tons F, 1.3 tons P₂O₅; weight ratio F:P₂O₅, 4.3]

(a) The combined liquors in line 4 contain ammonium salts of hydrofluoric, fluosilicic, phosphoric, sulfuric, and sulfurous acids, and minor amounts of iron and other compounds. The solution is treated with ammonia to raise the pH to about 8.5 at 5; silica and iron hydroxide are precipitated. It is preferable to use anhydrous ammonia to avoid dilution.

(b) Solids from 4(a) are separated by filtration at 6 and washed. The wash solution may be combined with the filtrate, or it may be recycled to the scrubbers.

(c) Acidulate solution from 4(b) to a pH of about 5 with sulfuric acid admitted at 9.

(d) Add a soluble aluminum compound to the solution from 4(c) to form ammonium cryolite at 8 according to the equation

Less aluminum than required by the equation should be used. The filtrate is reserved for step 6.

Step 5.—Conversion of ammonium cryolite to sodium cryolite or aluminum fluoride (a) The solid ammonium cryolite from step 4(d) is treated at 18 with an excess of sodium chloride (saturated solution) to convert the ammonium cryolite to sodium cryolite and ammonium chloride

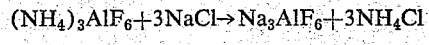

The sodium cryolite is filtered, washed, and dried. The filtrate is combined with the filtrate from step 4(d) and reserved for step 6. The wash water is discarded.

(b) By an alternate procedure the ammonium cryolite from step 4(d) is converted to aluminum fluoride at 22. The cryolite is washed with a small amount of water, and the wash solution is discarded. The washed solid is heated for 30 minutes at about 550° C. to decompose it as illustrated by the equation $$2(NH_4)_3AlF_6 \rightarrow 2AlF_3 + 3NH_3 + 3NH_4HF_2$$

The ammonia and ammonium bifluoride gases are recycled to step 4(d).

*Step 6.—Recovery of ammonia and phosphate*

Treat the combined filtrates from steps 4(d) and 5(a) with lime and heat to volatilize ammonia and precipitate phosphate. The ammonia, together with about an equal weight of water, is recycled to steps 1, 2, 3, and 4. The calcium phosphate, which is precipitated along with calcium fluoride and calcium sulfate, may be sold as fertilizer.

Bench-scale tests of steps 4, 5, and 6 were made with a mixture of three liquors that had been collected in a phosphate processing plant. The plant liquors, after ammoniation to remove silica and iron, were combined for these tests so that one-fourth of the total fluorine was furnished by ammoniated kiln gas scrubber liquor (stock solution 211; F, 29.4; $P_2O_5$, 3.3 grams per liter; weight ratio $F:P_2O_5$, 6.3; pH 8.5); one-half furnished by ammoniated liquor (stock solution M-17; F, 99.0; $P_2O_5$, 15.8 grams per liter; weight ratio $F:P_2O_5$, 6.3; pH 8.5) prepared from solution obtained in a small-scale scrubber test of metaphosphate furnace gas; and one-fourth by ammoniated liquor (stock solution 103A; F, 70.6; $P_2O_5$, 39.5 grams per liter; weight ratio $F:P_2O_5$, 1.8; pH, 8.5) prepared from spray water that had been recirculated in a phosphorus condenser system without bleed-off for several weeks.

In each of two tests, a volume of the combined ammoniated liquors (weight ratio $F:P_2O_5$, 4.04; pH 8.5) containing a total of 5.6 grams of fluorine was acidulated to pH 5 with sulfuric acid. Aluminum was added as a solution of aluminum sulfate in an amount corresponding to 95 percent of that theoretically required to react with all the fluorine to form ammonium cryolite. The mixture (pH 4) was stirred for a few minutes, and the precipitated ammonium cryolite was allowed to settle for about 15 minutes. In one test, the cryolite was filtered, washed with three 20-ml. portions of water, and dried at 110° C. The cryolite (sample A, 8.15 g.) contained 0.05 percent $P_2O_5$ and 56.8 percent fluorine, which represents a fluorine recovery of 82 percent. In the other test, the cryolite was washed once with 25 ml. of water. The dry cryolite (sample B, 8.67 g.) contained 0.07 percent $P_2O_5$ and 56.8 percent fluorine, which represents a fluorine recovery of 88 percent.

A 5-gram portion of ammonium cryolite (sample B) was mixed with water and twice as much sodium chloride as theoretically required to convert the ammonium cryolite to sodium cryolite; the quantity of water used corresponded to that required to form a saturated solution with the sodium chloride. The unheated slurry was stirred mechanically for 30 minutes; the solid phase was filtered and washed with three 30-ml. portions of water and then dried at 110° C. The sodium cryolite (5.38 g.) contained F, 52.3; Na, 32.1; Al, 13.6; and $P_2O_5$, 0.06 precent. The fluorine in the sodium cryolite represents 99 percent of that charged as ammonium cryolite.

The three stock solutions of ammoniated liquors were used to prepare a stock solution of spent cryolite liquor for tests of the recovery of ammonia and phosphate (step 6). In this preparation, the ammoniated liquors were combined in the same way as before, but contained a total of 22.4 grams of fluorine, a 4-fold increase. The conditions for the precipitation of ammonium cryolite and subsequent conversion to sodium cryolite were identical with those described above for tests of steps 4 and 5. The combined filtrates and washings (pH 5) contained 22 grams $NH_3$ per liter. In each of a series of tests, a 150-ml. portion of the spent cryolite liquor was treated with reagent-grade lime, the mixture was heated in a Kjeldahl flask, and the ammonia volatilized was determined as a function of the sample volume distilled. Results of the tests in which the lime used was sufficient to keep the slurries basic to phenolphthalein showed that 75 percent of the ammonia was vaporized when 7 percent of the spent cryolite liquor was distilled and that 98 to 100 percent of the ammonia was vaporized when 20 to 28 percent of the liquor was distilled.

Two tests were made to determine the quality of calcium phosphate formed when spent cryolite liquor was treated with lime in amounts similar to that used in the ammonia recovery tests. In one test, the unheated slurry was stirred mechanically for 30 minutes and the solid phase was filtered, washed twice with water, and then dried at 110° C. The crude phosphate contained 8.9 percent $P_2O_5$, of which 91 percent was citrate soluble. In the other test, the slurry was heated to expel the ammonia; the solid phase was filtered and washed as before. The dry product contained 8.9 per cent $P_2O_5$, of which 83 percent was citrate soluble. The crude phosphate produced in both tests contained more than 98 percent of the $P_2O_5$ initially present in the test samples of spent cryolite liquor.

Several decomposition tests of step 5(b) were made with a batch of ammonium cryolite that contained F, 56.7; Al, 13.8; $NH_3$, 25.8; and $P_2O_5$, 0.03 percent. Decomposition was incomplete after 30 minutes at 500° C. After 30 minutes at 550° C., however, the residue contained less than 0.5 percent ammonia. All volatile products were collected.

We claim as our invention:

1. A process for the manufacture of ammonium cryolite of specification grade which comprises preparing an impure aqueous solution of ammonium fluoride containing fluorine and phosphorus compounds in such proportions that the weight ratio $F:P_2O_5$ is in the range from 1:1 to 400:1, containing at least enough ammonium ion to form $(NH_4)_3AlF_6$ with all fluorine present and containing not more silica and iron than represented by $F:SiO_2$ and $F:Fe_2O_3$ weight ratios of 15:1 and 100:1, respectively; adjusting the pH of the solution in dependent relationship to the weight ratio $F:P_2O_5$ such that the minimum pH is about 4.0 at a weight ratio $F:P_2O_5$ of about 1:1, and simultaneously increasing in proportionate relationship substantially corresponding to a proportional increase in the weight ratio $F:P_2O_5$ the pH of said solution up to a maximum of about 7.0 at a weight ratio $F:P_2O_5$ of about 400:1; introducing a soluble aluminum salt into the solution; controlling the proportion of aluminum salt added to furnish from about 90 to 100 percent of the quantity of aluminum theoretically required to form $(NH_4)_3AlF_6$ with all fluorine present; adjusting the quantity of said added aluminum salt in dependent relationship to the weight ratio $F:P_2O_5$ such that substantially 90 percent of the theoretical quantity of aluminum is present at a weight ratio $F:P_2O_5$ of about 1:1, and that the quantity of said added aluminum is simultaneously increased in proportionate relationship substantially corresponding to a proportional increase in the weight ratio $F:P_2O_5$ in said solution to a maximum of approximately 100 percent of the theoretical quantity at a weight ratio of about 400:1; separating the resulting precipitate; washing the precipitate; and receiving ammonium cryolite of specification grade.

2. A process for the manufacture of ammonium cryolite of specification grade which comprises preparing an impure aqueous solution of fluorine compounds containing phosphorus compounds in such proportions that the weight ratio $F:P_2O_5$ is in the range from 1.5:1 to 125:1, containing at least enough ammonium ion to form $(NH_4)_3AlF_6$ with all fluorine present and containing not more silica and iron compounds than that represented by $F:SiO_2$ and $F:Fe_2O_3$ weight ratios of 15:1 and 100:1, respectively; adjusting the pH of the solution in dependent relationship to the weight ratio $F:P_2O_5$ such that the minimum pH is about 4.0 at a weight ratio $F:P_2O_5$ of about 1.5:1, and simultaneously increasing in proportionate relationship substantially corresponding to a proportional increase in the weight ratio $F:P_2O_5$ the pH weight ratio $F:P_2O_5$ of about 125:1; introducing a soluble of said solution up to a maximum of about 7.0 at a aluminum salt into the solution; adjusting the quantity of said added aluminum salt in dependent relationship to the weight ratio $F:P_2O_5$ such that substantially 90 percent of the theoretical quantity of aluminum is present at a weight ratio $F:P_2O_5$ of about 1.5:1, and that the quantity of said added aluminum is simultaneously increased in proportionate relationship substantially corresponding to a proportional increase in the weight ratio $F:P_2O_5$ in said solution to a maximum of approximately 100 percent of the theoretical quantity of aluminum as the weight ratio $F:P_2O_5$ becomes greater than about 40:1; separating the resulting precipitate; washing the precipitate; and receiving ammonium cryolite of specification grade.

3. A process for the manufacture of ammonium cryolite of specification grade which comprises preparing an impure aqueous ammonium fluoride solution containing fluorine, phosphorus, silicon and iron compounds in such proportions that the weight ratio $F:P_2O_5$ is in the range from 4:1 to 400:1, the weight ratio $F:SiO_2$ is at least 15:1 and the weight ratio $F:Fe_2O_3$ is at least 100:1; adjusting the pH of the solution in dependent relationship to the weight ratio $F:P_2O_5$ such that the minimum pH is about 4.5 at a weight ratio $F:P_2O_5$ of about 4:1, and simultaneously increasing in proportionate relationship substantially corresponding to a proportional increase in the weight ratio $F:P_2O_5$ the pH of said solution up to a maximum of about 7.0 as the weight ratio $F:P_2O_5$ becomes greater than about 40:1; introducing a soluble aluminum salt into the solution; adjusting the quantity of said added aluminum salt in dependent relationship to the weight ratio $F:P_2O_5$ such that substantially 95 percent of the aluminum salt required to form $$(NH_4)_3AlF_6$$

with all fluorine in the solution is present at a weight ratio $F:P_2O_5$ of about 4:1, and that the quantity of said added aluminum salt is simultaneously increased in proportionate relationship substantially corresponding to a proportional increase in the weight ratio $F:P_2O_5$ in said soluton to a maximum of approximately 100 percent of the aluminum salt required to form $(NH_4)_3AlF_6$ with all the fluorine in the solution as the weight ratio $F:P_2O_5$ becomes greater than 40:1; separating the resulting precipitate; washing the precipitate; and receiving ammonium cryolite of specification grade.

References Cited in the file of this patent
UNITED STATES PATENTS

| | | |
|---|---|---|
| 1,511,561 | Howard | Oct. 14, 1924 |
| 1,850,017 | Lehrecke | Mar. 15, 1932 |
| 2,573,282 | Sciacca et al. | Oct. 30, 1951 |
| 2,687,341 | Mockrin | Aug. 24, 1954 |
| 2,780,524 | Gloss et al. | Feb. 5, 1957 |
| 2,816,818 | Gross | Dec. 17, 1957 |
| 2,916,352 | Fitch et al. | Dec. 8, 1959 |

UNITED STATES PATENT OFFICE
CERTIFICATION OF CORRECTION

Patent No. 2,981,597                          April 25, 1961

Grady Tarbutton et al.

It is hereby certified that error appears in the above numbered patent requiring correction and that the said Letters Patent should read as corrected below.

Column 1, line 16, for "Govermnet" read -- Government --; line 25, for "The" read -- They --; column 3, line 65, for "imprities" read -- impurities --; column 5, line 29, for "Specification" read -- Specific --; column 6, first table, subheading to first column, for "F=$P_2O_5$" read -- F:$P_2O_5$ --; same table, third item, for "25:1-" read -- 10:1 --; column 11, line 10, strike out "weight ratio F:$P_2O_5$ of about 125:1; introducing a soluble" and insert the same after "7.0 at a" in line 11, same column; column 12, line 18, for "soluton" read -- solution --.

Signed and sealed this 26th day of September 1961.

(SEAL)
Attest:

ERNEST W. SWIDER                        DAVID L. LADD
Attesting Officer                     Commissioner of Patents